June 23, 1936.  C. A. LAISE  2,044,853
METHOD OF MAKING CUTTING TOOLS, DIES, ETC
Filed Jan. 21, 1932
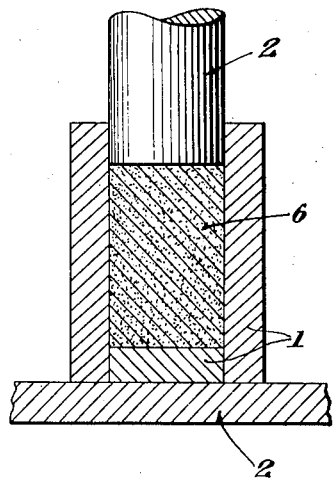
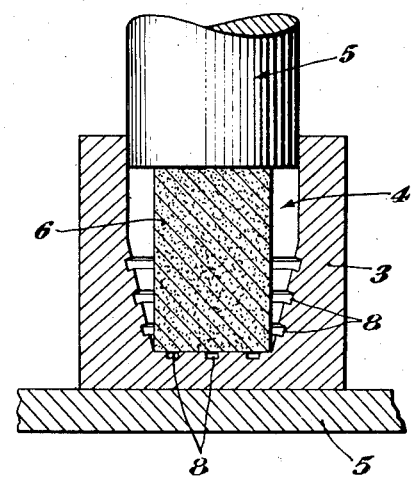
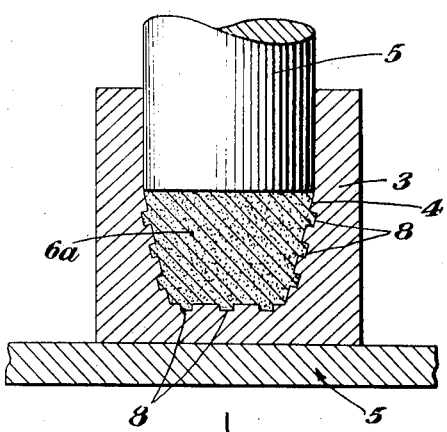
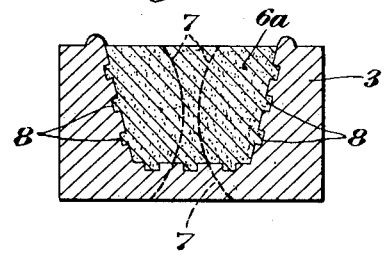
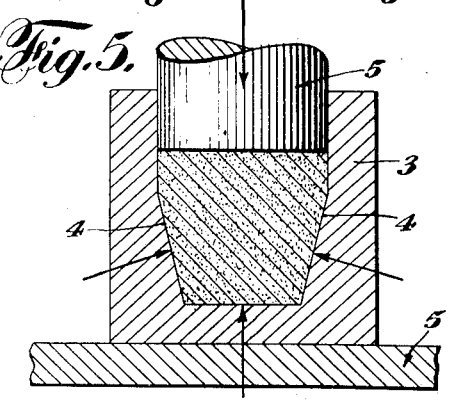
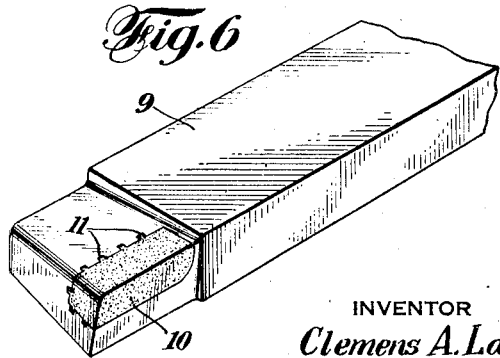
INVENTOR
Clemens A. Laise
BY
ATTORNEY Patented June 23, 1936

2,044,853

UNITED STATES PATENT OFFICE 2,044,853

METHOD OF MAKING CUTTING TOOLS, DIES, ETC.

Clemens A. Laise, Tenafly, N. J., assignor to Eisler Electric Corporation, Newark, N. J., a corporation of Delaware Application January 21, 1932, Serial No. 587,961

6 Claims. (Cl. 75—137)

This invention relates to improvements in methods of making cutting tools, wire-drawing and extrusion dies and other tools and implements having bearing, wearing and/or cutting surfaces and edges of great hardness, toughness and durability.

An object of the invention is to produce a tool or implement in which the wearing and/or bearing and/or cutting part or nib is more perfectly joined, welded and secured to its iron, steel, nickel, copper, brass or other similar metal holder or backing; and is also itself adapted to be made especially hard, tough and durable to produce a completed tool or implement of superior quality. Moreover, the process is such that it enables production of said tools or implements at a considerable saving in cost as compared with present methods.

A further object is to produce said nibs and/or tools with their bearing, wearing and cutting surfaces and edges free from pits and blow-holes and similar defects.

Another object is to produce the improved nibs separately and apart from any tool-blank or holder, to which said nibs may subsequently be secured in any known or preferred way.

The materials I employ for making the hard refractory parts or nibs comprise, generally speaking, refractory carbides such as the carbides of tungsten, tantalum, molybdenum, beryllium, chromium, silicon, aluminum, etc., or mixtures of these, and I mix and incorporate with the foregoing in a fine state of subdivision fine metal powders, five to thirty per cent. by weight, comprising iron, cobalt, copper, chromium and/or nickel or other metal suitable for binding together the refractory carbides when the mixture is subjected to my combined heat and pressure treatments as hereinafter described.

To aid in the understanding of the process, I have annexed hereto diagrammatic drawing illustrative thereof as follows: Fig. 1 shows the molding of the partially formed nib; Figs. 2 and 3 show the compression and compacting of this nib upon itself and into secured position in a tool-blank or holder; Fig. 4 shows the finished die; Fig. 5 serves to illustrate the equalizing of the vertical and lateral compression forces on the nib material; and Fig. 6 illustrates a lathe tool with cutting nib combined therewith in accordance with my invention.

My process comprises the following steps, if it be desired to make a composite body consisting of a combined nib and holder:

(1) I take a tool-blank, holder or implement and form therein a suitably shaped recess to receive the refractory metal body or nib which is to constitute or embody the wearing and bearing surfaces of the finished article and/or the cutting edges or parts thereof.

(2) I then partially prepare the aforesaid refractory metallic body or nib as follows: I lightly compact a mixture of finely divided refractory carbide or carbides and finely divided base metal or metals acting as a binder in a previously prepared, carbon or the like mold suited in shape to the aforesaid recess in the holder. I then suitably apply high temperature heat thereto up to 1700° C. or higher to render as plastic as practicable the finely divided material in the mold whereby I succeed in molding and forming said material into a partially formed refractory metallic body or nib adapted then to be seated and compressed into the recess of the tool-blank or holder. By lightly compacting the initial mixture, I increase its density and bring the particles closer together so that the heating and plasticizing treatment can more efficiently and effectively be applied and more uniformity obtained in the composition of the body or nib. Thus, I actually preliminarily shape and partially form the nib and ensure the production of a relatively dense nib mixture which may very effectively be united to the tool or die in the manner I shall presently describe, and which is not subject to such diminution in size as to render it insufficient of size to fill the space provided therefor in the tool or die holder with which it is subsequently to be united. As a variant of the foregoing, I may remove the nib from the mold before the plasticizing heat treatment is completed and then finish the heat treatment of the nib outside of or apart from the mold. The referred to lightly compacting pressure will be up to about several hundred pounds to the square inch.

(3) Meanwhile, I have heated the recessed tool-blank or holder to a yellow heat.

(4) I then quickly seat the refractory metallic body or nib, while still highly heated and in a plastic condition, in the recess of the tool-blank heated as described to a yellow heat; and by using a suitable powerful press, hydraulic or otherwise, I immediately suitably apply a high pressure of the order of 10 or 20 to 50 or 60 tons per square inch to compress and densely compact the refractory body as uniformly as possible in all directions, and powerfully to force together the refractory body and the recessed portion of the tool-blank or holder whereby the highly heated, sufficiently plastic refractory body is densely compacted and forced into intimate contact and union with the corresponding surfaces and walls of the recess and into the grooves and ridges, preferably provided therein for anchoring the refractory metallic body very securely in position in or on the tool-blank, holder or implement.

(5) The foregoing combination of steps produces the tool, die or implement which then needs only to be finished by modifying the shape of the blank or holder, if necessary, and by grinding, drilling, cutting or otherwise forming and polishing the surfaces and/or edges of the refractory metallic body or nib to the proper shape and form suitable for the particular work for which the tool, die or implement is intended. Thus, if the produced implement is intended for a wire-drawing die, the nib is machined together with its holder. The nib is shaped, drilled and cut with diamond chips or carborundum, etc. powder applied by machines of any existing or preferred form suitable for the purpose. If the die is to have an extra large hole through it, the mold used in connection with the operation No. 2 of the process is so constructed that a carbon or other suitable core is located in the mold so as to constitute the center of the refractory metallic body or nib which is molded around it whereby a core is formed in the nib that can be readily removed subsequently to make the hole through the nib.

Referring to the diagrams, Fig. 1 shows the carbon mold 1 and the plunger press means 2 for lightly compacting the refractory carbide and metallic powder, after which it is subjected to the high temperature heat treatment to produce the partially formed refractory metallic body or nib 6 of step No. 2 of the process.

Fig. 2 shows the tool-blank, holder or implement 3 formed with the recess 4 suitable for receiving the nib 6 as described in connection with step No. 1. This Fig. 2 also shows the application of the high pressure means 5 of step No. 4 for compressing the highly heated nib to densely compact same and at the same time powerfully force it into intimate welding contact and union with the surfaces and walls of the recess in the tool-blank or holder 3. This densely compacted and welded-in nib now has the shape of the holder-recess and is designated 6ª in Fig. 3.

Fig. 4 shows the finished die after suitably machining off the upper portion of the holder 3 and suitably forming the die-opening or hole 7 through it.

8 designates in Figs. 2, 3, 4, and 6 the grooves for anchoring the nib 6ª securely in place in or onto the tool-blank or holder.

Fig. 5 illustrates how the inclination of the walls of the recess in the blank tends to equalize the pressures on the plastic nib material in all directions while it is being densely compacted into substantially its final shape.

Fig. 6 shows a lathe tool-blank 9 fitted in accordance with my invention with a cutting nib 10 of refractory carbide material anchored in a suitable recess thereby and by means of the grooves 11.

Referring to the material make-up of the nibs, I have especially found that tungsten carbide mixed with one to two percent. by weight of tantalum carbide and bonded or alloyed with a metal powder consisting substantially of five to forty percent. cobalt and one-quarter to two percent. of chromium, constitutes a material which when treated in accordance with the foregoing process produces a splendid cutting and bearing material for the nib. Nibs made of this material are especially suited to operations where the bearing surface is subjected to great strain and heat, and said surface takes a high polish so desirable in wire-drawing dies. The relative percentage of tungsten carbide to the cobalt powder depends upon the degree of hardness and toughness desired. Thus, the lower the percentage of the cobalt, the harder and more brittle is the resultant nib, and vice versa. The tantalum carbide improves the cutting tool in that its presence prevents the tool and the chips from heating up excessively; and the chromium serves to increase the toughness and hardness of the nib.

The powders of the aforesaid ingredients I prefer to produce as follows: First, I mix tungsten oxide with tantalum oxide in the proportion of 1,000 grams of tungsten oxide to 20 grams of tantalum oxide. To these refractory oxides I then add 250 grams of cobalt oxide and 2 grams of finely divided chromium metal. This uniform mixture is then placed into nickel boats and reduced for a period of two hours in an electric furnace with hydrogen at a temperature ranging from 700° to 950° C. After reduction, 4 to 8 per cent. by weight of carbon in the form of lamp-black is added to the mixture and carefully milled for three hours. This mixture is then placed into a carbon tube furnace in carbon boats and is carburized in a hydrogen atmosphere at substantially a temperature of 950° for two hours.

This mixture is next removed from the carbon tube furnace and comes out in the form of loosely compacted carbide. This is broken up and sieved through a 200 mesh sieve and is now ready to be molded at high temperatures and then compressed on to the tool-blanks or holders suitable for use for tools and dies after the manner previously described.

I find that by reducing the mixtures of the refractory and binding metallic oxides as aforesaid in one stage that a very fine grain structure is obtained in the finished nib which imparts great strength, toughness and hardness to the resultant product.

Instead of, as aforesaid, reducing the cobalt oxide with the tungsten oxide and/or other refractory oxides and carburizing them together, I may add the finely divided binder metal ingredient to the refractory metal carbide ingredient, in which case, however, I find that I do not get as fine a grain structure in the resultant product. The bonding base metal is selected so that it will alloy with the metallic holder and will be chosen according to whether the tool-blank or holder consists of steel, stainless steel, nickel, etc., or however else the material thereof may vary.

Usually, if the refractory carbide powders are to be molded on to a steel backing, tool-blank or holder, I select either cobalt or nickel or mixtures of the two as the bonding powders. I may, however, in other cases resort to mixtures containing beryllium, tantalum, tungsten, chromium and/or manganese and the like.

The mold described as being used in connection with step No. 2 of the process will preferably be made of carbon or of other suitable refractory material.

The powders, as described in connection with step No. 2, are lightly compressed in this mold through the use of hand pressure, arbor presses or power presses.

The lightly compacted powders together with the mold or without the mold are placed into a high temperature furnace, either a gas, electric induction or other suitable furnace, until the particles become plastic. The atmosphere in which this is carried out will be preferably hydrogen, illuminating gas, or other reducing atmosphere. If a mold of carbon material is employed, it will itself create a sufficiently reducing atmosphere so that no reducing gas is necessary, but otherwise a reducing atmosphere is desirable although not essential.

As stated, while the lightly compressed powders are being brought into a state of plasticity by the high temperature applied thereto, the steel or other metallic tool-blank or holder is also heated, preferably to a yellow heat, either in a gas or electric furnace or blow torch or by electrical induction especially at the place or recess at which the nib is to be inserted and secured.

The high pressure applied to the highly heated plastic molded powders and to the hot tool-blank or holder for the same, densely compacts the lightly compacted plastic body and strongly forces it into the grooves, crevices and pores of the metallic holder, and the combined pressure and heat causes the constituents of said plastic powders to flow into one another and to intimately conglomerate or alloy with one another and with the heat-softened material of the tool-blank or holder whereby, after cooling, a composite structure is produced consisting of the metallic tool-blank or holder having joined or welded thereto most intimately an exceedingly hard and tough refractory metallic body or nib adapted to constitute and embody exceedingly hard, tough and durable wearing and/or cutting surfaces and edges.

The temperature to which I heat the lightly compacted powders is a white heat ranging up to 1700° C. or to a higher temperature sufficient to give plasticity to the powders.

The temperature of the tool-blank or holder into or onto which the highly heated powdered body is compressed, compacted and welded, should be a yellow heat or a temperature approaching the softening point of the tool-blank or holder and, therefore, will be a temperature which depends upon the composition of the particular blank or holder.

The pressure to be employed in carrying out step No. 4 of the process may range from about ten to about sixty tons per square inch depending upon the composition of the powders to be compressed and upon the particular metallic make-up of the tool-blank or holder.

In applying these high pressures, it is especially desirable that they be uniformly distributed throughout the mass of the refractory metallic body that is to constitute the nib. Thus, to produce a superior product, it is especially desirable that the recesses be so shaped in the tool-blank or holder wherein the highly heated refractory powders are compacted in a plastic condition that the pressure on the refractory powders shall be substantially uniform in all directions. For example, if a straight cylindrical lightly compacted nib such as is used for a wire-drawing die should be compressed in a cylindrical walled recess of the die holder, then the pressure on the upper and lower surfaces of the nib would be the same, but the lateral pressure thereon would be less and the density in the middle of the nib would be less than that on the ends and the resultant product would, therefore, be non-uniform. Therefore, instead of this, I prefer to employ a die holder having an internal taper (see Figs. 2 and 5) such that the applied pressure is substantially uniform vertically and laterally whereby the resultant nib possesses a substantially uniform density throughout and moreover is free from blow-holes.

Also, there are other methods and means of getting uniform density and compactness throughout the mass such as by using a press having both vertical and lateral plungers adapted to be applied to the tool-blank or holder and to the seated nib with production of pressures thereon which are substantially uniform in all directions.

The invention also includes producing nibs separate and apart from any tool-blanks or holders. In this case, the process will begin with step No. 2. Steps Nos. 1 and 3 will be omitted. It will continue with step No. 4 except that the plastic nib will be preferably pressed into a suitably strong mold instead of into a recessed tool-blank or holder. The mold may be made of separable parts to permit the subsequent easier removal of the nib. Moreover, preferably the material of the mold should be such, or the mold should be lined with a material which will not alloy or combine with the materials of the nib. In this case also a press may be used which will apply the heavy vertical and lateral pressures in substantially equal amounts to the mold and to the contained plastic partially formed nib.

It will be understood that other changes and modifications in the foregoing illustrative examples of my invention may be made without departing from the scope and spirit thereof and which accordingly are intended to be covered by the appended claims.

What I claim is:

1. Method of making nibs for tools, dies, etc., comprising reducing finely divided mixed oxides of a refractory metal and a binder metal with hydrogen at an elevated temperature, carburizing said reduced material, breaking up the carburized product into finely divided form, lightly compacting and molding the same at a high temperature, and then subjecting the molded product to a high pressure sufficient to densely compact the same.

2. Method of making nibs for tools, dies, etc., comprising reducing finely divided mixed oxides of a refractory metal, including tantalum, and a binder metal with hydrogen at an elevated temperature, carburizing said reduced material, breaking up the carburized product into finely divided form, lightly compacting and molding the same at a high temperature, and then subjecting the molded product to a high pressure sufficient to densely compact the same.

3. Method of making nibs for tools, dies, etc., comprising reducing finely divided mixed oxides of a refractory metal and a binder metal including chromium, with hydrogen at an elevated temperature, carburizing said reduced material, breaking up the carburized product into finely divided form, lightly compacting and molding the same at a high temperature, and then subjecting the molded product to a high pressure sufficient to densely compact the same.

4. The method of making tool and die tips and nibs comprising reducing with hydrogen homogeneous mixtures of finely divided oxides of refractory metals and oxides of base metals, carburizing said reduced materials up to the point where the carbide-forming metals have absorbed their chemical equivalent of carbon, comminuting said carburized product, lightly compacting and molding the same at elevated temperatures, and then subjecting the molded product to a high pressure and temperature into a densely compacted mass.

5. The method of making tool and die tips and nibs comprising reducing homogeneous mixtures of finely divided oxides of refractory metals and oxides of base metals, carburizing said reduced materials, comminuting said carburized product, lightly compacting and molding the same at elevated temperatures, and then subjecting the molded product to a high pressure and temperature into a densely compacted mass.

6. Method of making nibs for tools, dies, etc., comprising reducing finely divided refractory metal oxides mixed with a binder metal at an elevated temperature, carburizing said reduced material, breaking up the carburized product into finely divided form, lightly compacting and molding the same at a high temperature, and then subjecting the molded product to a high pressure sufficiently to densely compact the same.

CLEMENS A. LAISE.